United States Patent
Youtz et al.

(10) Patent No.: US 8,923,877 B2
(45) Date of Patent: Dec. 30, 2014

(54) METHOD AND APPARATUS FOR PROVIDING CARRIER ADJUSTMENT TO MITIGATE INTERFERENCE

(75) Inventors: Andrew Youtz, Rocky Hill, NJ (US); Iftekhar Rahman, Billerica, MA (US); Pingping Zong, Randolph, NJ (US); Zheng Zhao, Plainsboro, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1130 days.

(21) Appl. No.: 12/633,179

(22) Filed: Dec. 8, 2009

(65) Prior Publication Data
US 2011/0136497 A1 Jun. 9, 2011

(51) Int. Cl.
*H04W 72/00* (2009.01)
*H04B 1/00* (2006.01)
*H04B 1/10* (2006.01)
*H04W 72/08* (2009.01)

(52) U.S. Cl.
CPC .......... *H04B 1/1027* (2013.01); *H04W 72/082* (2013.01)

USPC ...................... 455/452.2; 455/63.1; 455/63.3

(58) Field of Classification Search
USPC ..................... 455/452.2, 63.1, 63.3
See application file for complete search history.

(56) References Cited

U.S. PATENT DOCUMENTS

| | | | |
|---|---|---|---|
| 2007/0066261 A1* | 3/2007 | Haralabidis et al. | 455/255 |
| 2008/0182580 A1* | 7/2008 | Laroia et al. | 455/440 |
| 2009/0176453 A1* | 7/2009 | Wilhelmsson et al. | 455/41.2 |
| 2010/0128689 A1* | 5/2010 | Yoon et al. | 370/329 |
| 2010/0197235 A1* | 8/2010 | Wilhelmsson | 455/63.3 |

* cited by examiner

*Primary Examiner* — Omoniyi Obayanju (57) ABSTRACT

An approach is provided for mitigating interference from Long Term Evolution (3GPP LTE) terminals to adjacent frequency bands. A platform determines whether a region associated with transmission of one or more resource blocks are an interfering region according to predetermined criteria, where one or more resource blocks are assigned a primary carrier as a default carrier for the transmission. The platform selects a secondary carrier for the one or more resource blocks instead of the primary carrier if the region is determined to be interfering.

19 Claims, 7 Drawing Sheets

METHOD AND APPARATUS FOR PROVIDING CARRIER ADJUSTMENT TO MITIGATE INTERFERENCE

BACKGROUND INFORMATION

Consumer adoption of mobile devices, such as cellular telephones, laptop computers, pagers, personal digital assistants, and the like, is increasing. These devices can be used for a diversity of purposes ranging from basic communications, to conducting business transactions, to managing entertainment media, as well as a host of other tasks. Given the sophistication of data applications in addition to traditional voice, these mobile devices are continually transmitting over the air. Not surprisingly, the increased usage of the devices and corresponding demand on the service provider to support more and more capacity have posed greater challenges in minimizing interference. Notably, a key source of interference is caused by unwanted out-of-band emissions of these devices. Such unwanted out-of-band emissions can stem from intermodulation products generated in the device power amplifier, as well as adjacent channel leakage due to nonlinearities in the power amplifier. This interference is particularly prominent when transmission occur on adjacent bands or channels.

Therefore, there is a need for an approach to mitigate interference from the terminals operating, for example, in adjacent bands.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and system for mitigating interference between terminals operating in adjacent frequency bands are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to various enumerated radio access technologies and application services, it is contemplated that various exemplary embodiments are also applicable to other suitable or equivalent access technologies and application services.

Figure 1:
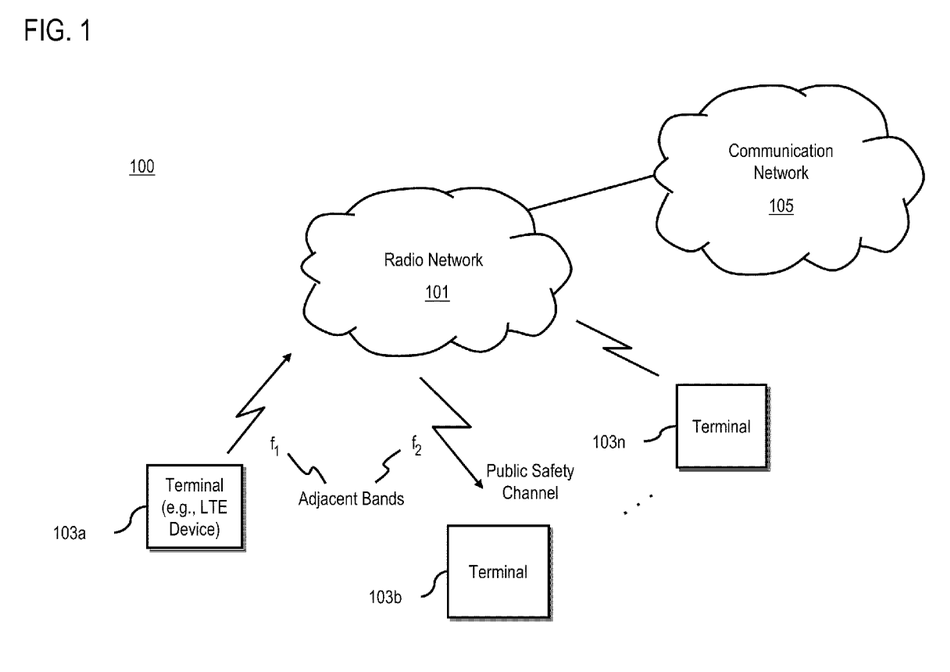
FIG. 1 is a diagram of a communication system capable of providing carrier adjustment, according to an exemplary embodiment.

FIG. 1 is a diagram of a communication system capable of providing carrier adjustment, according to an exemplary embodiment. For the purpose of illustration, the communication system 100 can include a radio network 101 that supports a number of wireless terminals 103a-103n, which may be fixed or mobile, using various radio access technologies. According to certain embodiments, the terminals 103a-103n operate according to a third generation partnership project (3GPP) long term evolution (3GPP LTE) architecture. However, other radio technologies are contemplated: cellular digital packet data (CDPD), etc.), third generation (3G) technologies (e.g., code division multiple access 2000 (CDMA2000), general packet radio service (GPRS), universal mobile telecommunications system (UMTS), etc.), 4G, etc. For instance, various mobile communication standards have been introduced, such as third generation (3G) technologies (e.g., code division multiple access 2000 (CDMA2000), general packet radio service (GPRS), universal mobile telecommunications system (UMTS), etc.), and beyond 3G technologies (e.g., third generation partnership project (3GPP) long term evolution (3GPP LTE), 3GPP2 universal mobile broadband (3GPP2 UMB), etc.).

Complementing the evolution in mobile communication standards adoption, other radio access technologies have also been developed by various professional bodies, such as the Institute of Electrical and Electronic Engineers (IEEE), for the support of various applications, services, and deployment scenarios. For example, the IEEE 802.11 standard, also known as wireless fidelity (WiFi), has been introduced for wireless local area networking, while the IEEE 802.16 standard, also known as worldwide interoperability for microwave access (WiMAX), has been introduced for the provision of wireless communications on point-to-point links, as well as for full mobile access over longer distances. Other examples include Bluetooth, ultra-wideband (UWB), the IEEE 802.22 standard, etc.

By way of example, the radio network 101 has connectivity to a communication network 105, which may include one or more networks such as a data network and/or a telephony network. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. Moreover, the telephony network can be provided via a combination of circuit-switched technologies or a packetized voice infrastructure.

In the example of FIG. 1, the LTE terminal 103a can use a spectrum with frequency $f_1$ as an uplink channel (i.e., communication in the direction from the LTE terminal 103a to the radio network 101). In an embodiment, the radio network 101 can include a base station (not shown) that establishes a downlink channel (from the network 101 to the terminal 103a) to communicate with the LTE terminal 103a, according to Orthogonal Frequency-Division Multiplexing (OFDM). OFDM advantageously provides for spectrum flexibility and enables cost-efficient solutions for wide carriers with high peak rates. OFDM is used, for example, in standards such as IEEE 802.11a/g, 802.16, HIPERLAN-2, digital video broadcasting (DVB) and digital audio broadcasting (DAB). In the uplink channel, the radio network 101 can use a pre-coded version of OFDM called Single Carrier Frequency Division Multiple Access (SC-FDMA), according to one embodiment. It is contemplated that other protocols may be utilized. In one embodiment, the uplink is an LTE link, while the downlink can be compliant with other non-LTE architectures.

Long term evolution (LTE) is designed to increase capacity and speed of wireless networks such as mobile phone networks. However, an uplink channel (for communication between a terminal and a base station) for the 3GPP LTE system can be adjacent to a downlink channel (for communication between a base station and a terminal) for other systems, such as public safety radios. As a result of close proximity, out-of-band emissions from a transmitter in an LTE terminal may interfere with nearby public safety receivers. For example, if the network 101 utilizes upper 700 MHz C-Block, there may be only a limited guard band (e.g., 2 MHz under present LTE standards) between the 3GPP LTE channel and the public safety channel. Such a guard band is insufficient for current filter technologies to provide the necessary attenuation of the LTE transmitter's out-of-band emissions.

One approach for mitigating 3GPP LTE interference with public safety bands focuses on using Physical Uplink Control Channel (PUCCH) over-dimensioning in conjunction with tighter power output and emissions limitations on the LTE device's transmitter. However, this approach can result in reduced system capacity and throughput. In addition, the tighter emissions limitations on the device may require a more linear power amplifier, which negatively impacts power amplifier efficiency and device battery life.

Under the scenario of FIG. 1, a base station (not shown) within the radio network 101 can be configured to establish a public safety channel using a pre-designated downlink. For example, the terminal 103b can receive public safety information over the downlink channel that uses a carrier frequency, $f_2$. However, as mentioned above, the frequency band, $f_1$, of the uplink channel of the system 103a may be adjacent to the frequency band, $f_2$, of the downlink channel of the public safety system. Therefore, out-of-band emissions from the transmitter of the terminal 103a may interfere with the nearby terminal 103b. As noted, these unwanted out-of-band emissions are caused by intermodulation products (i.e., IM3 and to a lesser extent IM5) that are generated in the terminal's power amplifier between a desired signal and a carrier leakage and an image leakage. Also, adjacent channel leakage due to nonlinearities in the power amplifier produces such emissions. These intermodulation products and adjacent channel leakage cannot be filtered by the duplexer or post power amplifier filtering when $f_1$ and $f_2$ are very close to each other due to limitations with current filter technologies.

To minimize interference, the system 100 utilizes a scheme whereby the carrier frequency is adjusted upon determination that the region in which the terminals are operating constitute an interfering region—i.e., the out-of-band emissions results in an interference level that exceeds a predetermined threshold. Such approach for interference avoidance is more fully described below with respect to FIGS. 2-4.

Figure 2:
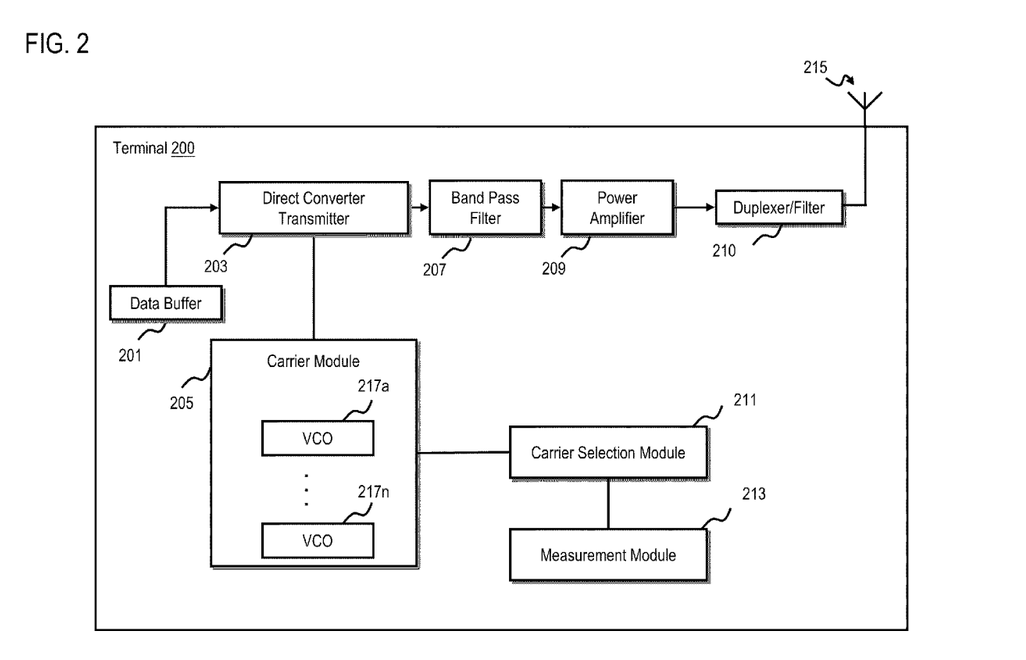
FIG. 2 is a diagram of components of a transmitter of a terminal in the system of FIG. 1, according to an exemplary embodiment.

FIG. 2 is a diagram of components of a transmitter of a terminal in the system of FIG. 1, according to an exemplary embodiment. For the purpose of illustration, a terminal 200, e.g., terminal 103a of system 100, includes various components constituting a transmission chain for operation within an LTE environment. As shown, a data buffer 201 stores data that is scheduled for transmission. The terminal 200 also includes a direct converter transmitter 203 that is responsible for generating a modulated signal based on the data; the direct converter transmitter 203 couples to a carrier module 205 for determining a carrier to be modulated. The modulated signal is sent through a band pass filter 207 and amplified for transmission via a power amplifier 209, which outputs to a duplexer or filter 210. The duplexer 210 provides bi-directional communication over the radio network 101.

Further, a carrier selection module 211 operates in conjunction with a measurement module 213 to assist the carrier module 205 in selection of an appropriate carrier. Antenna 215 receives output of the duplexer or filter 210 to emit a signal over the air. Carrier module 205 provides multiple carriers using voltage-controlled oscillators (VCOs) 217a-217n, which can be two or more VCOs, according to certain embodiments. It is contemplated that the VCOs 217a-217n can include a fixed VCO as well as a variable VCO.

By way of example, the terminal 200 is configured to transmit the data stored in buffer 201 over an uplink channel. The direct converter transmitter 203 is configured to utilize an appropriate set of resource blocks to represent the data as a low-pass equivalent signal. Further, the direct converter transmitter 203 is configured to modulate a radio frequency (RF) carrier with the low-pass equivalent signal. The RF signal is passed through the band pass filter 207, amplified by the amplifier 209 and is transmitted on the uplink channel.

Additionally, the direct converter transmitter 203 obtains the radio frequency carrier from the carrier module 205. The voltage-controlled oscillators 217a-217n can generate different radio frequency carriers. The carrier selection module 211 selects the proper carrier for the carrier module 205, based on a predetermined criteria; such criteria can relate to the level of interference generated by a default carrier for the uplink channel. This selected carrier is to be used by the direct converter transmitter 203. According to one embodiment, the direct converter transmitter 203 uses a primary radio frequency carrier generated by one of the voltage-controlled oscillators as a default carrier for transmission—e.g., VCO 217a. The carrier module 205 can designate a default carrier as a primary carrier for the uplink channel, and subsequently adjust this primary carrier by selecting a different carrier (denoted as a "secondary carrier") in response to a control signal or command from the carrier selection module 211.

In other words, if terminal 200 determines or detects that a certain resource block allocation using the primary radio frequency carrier generates unwanted intermodulation products into any adjacent frequency bands, the carrier selection module 211 can adjust the carrier that is employed by selecting a secondary radio frequency carrier using one or more criteria. In an embodiment, the measurement module 213 receives parameters relating to the quality of the adjacent channels. For example, with LTE, a base station may signal stricter emission requirements. Moreover, in other environments, interference data from the base station regarding any interference of transmitted data using the primary radio frequency carrier and one or more adjacent frequency bands. The carrier selection module 211 can determine whether the interference data or data derived therefrom satisfy a predetermined criteria for selection of a secondary radio frequency carrier. The carrier selection module 211 can also determine a proper frequency value for the secondary radio frequency carrier. In another exemplary embodiment, the measurement module 213 takes measurements of parameters associated with the channel to determine any interference or degraded channel state. In another exemplary embodiment, the measurement module 213 can estimate or predict an interference condition associated with any interference of transmitted data using the primary radio frequency carrier and the adjacent frequency bands.

Figure 3A:
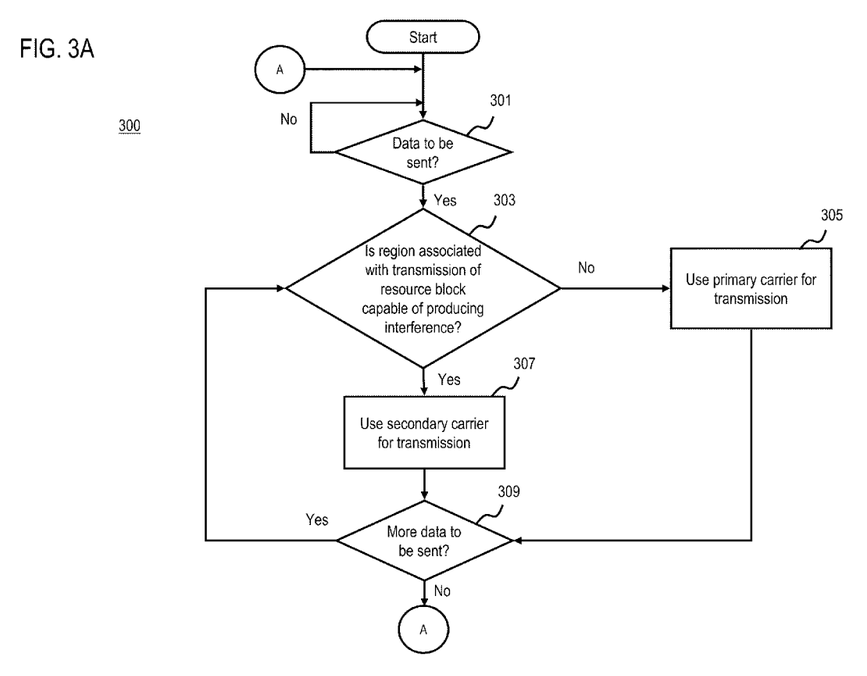
FIGS. 3A and 3B are flowcharts of a process for mitigating interference from a terminal to adjacent frequency bands, according to an exemplary embodiment.
Figure 3B:
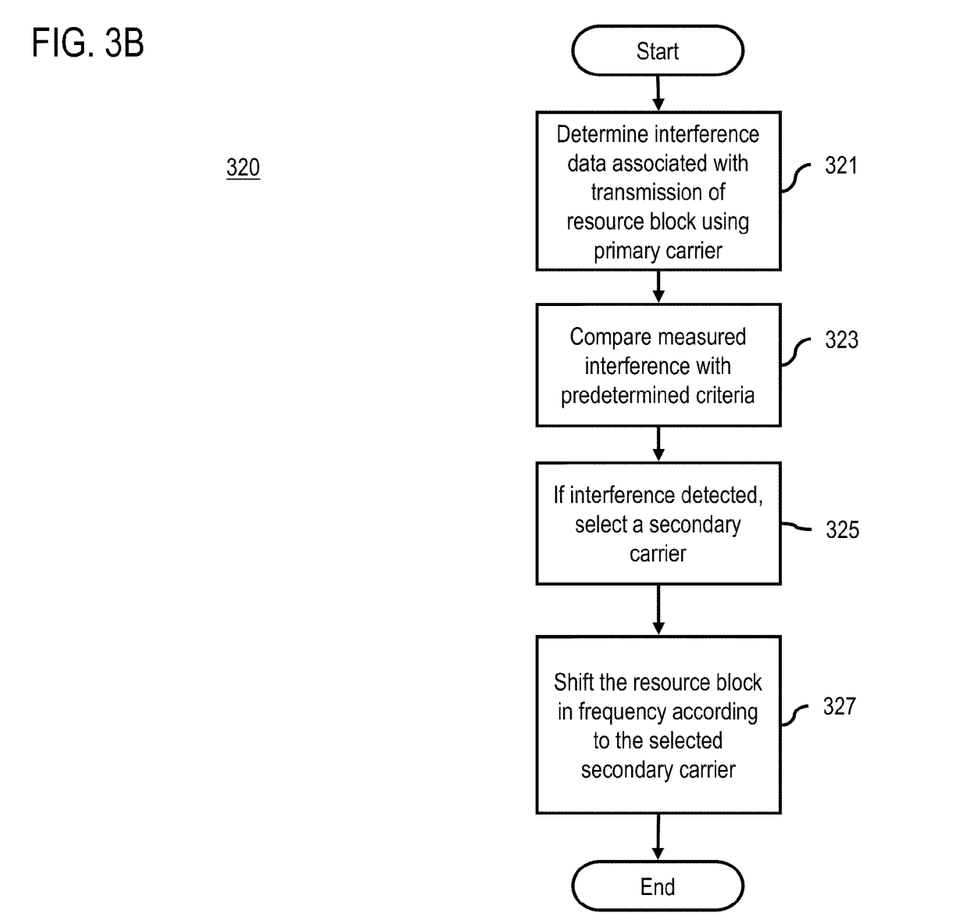

FIGS. 3A and 3B are flowcharts of a process for mitigating interference from a terminal to adjacent frequency bands, according to an exemplary embodiment. In one embodiment, the process 300 is performed at terminal 200 of FIG. 2. In step 301, the process 300 determines whether there is any data to be transmitted over a channel (e.g., uplink) that uses a primary frequency carrier. If no data is present in the data buffer (or transmission queue) 201, the process 300 waits for data. If there is data to be sent, the process 300 determines at step 303 whether a region associated with a resource block allocation that is used to transmit the data is capable of producing interference. Such determination, as explained, can be performed by the carrier selection module 211 in conjunction with the measurement module 213. For instance, if the carrier selection module 211 analyzes certain parameters relating to the interference level of the relevant adjacent frequency bands, and determines the level satisfies a predetermined interference threshold (or one or more criteria), then a secondary carrier is to be selected for the transmission of the data.

If the region associated with the transmission of the resource block is not an interference region, at step 305, the terminal 200 uses a primary radio frequency carrier to transmit the data. However, if the region is deemed to be an interference region, the process 300 adjusts the primary radio frequency carrier to a secondary radio frequency carrier that will minimize the interference relative to the primary radio frequency carrier (step 307). It is noted that the carrier adjustment can be made after each data transmission, upon detection of an unacceptable level of interference is occurring, or based on each resource block allocation before transmission.

After data transmission, the process checks, at step 309, whether more data is to be transmitted on the uplink channel. If no data is to be transmitted, the process ends. If more uplink data is to be sent, the process 300 continues at step 303.

FIG. 3B shows an exemplary process for adjusting the carrier frequency to mitigate interference, according to one embodiment. In this example, a resource block (i.e., data) is transmitted using a primary radio frequency carrier. In step 321, process 320 determines interference data based on measured channel parameters (e.g., signal-to-noise (SNR), carrier-to-noise (C/N), etc.) associated with out-of-band emissions for transmission of the resource block using the primary radio frequency carrier. As discussed above, the measurement can be performed, for example, at measurement module 213, which can determine interference data by measuring the channel and/or power amplifier performance for parameters relating to intermodulation products (i.e., IM3 and to a lesser extent IM5) and adjacent channel leakage. In another embodiment, the measurement module 213 can receive interference date directly from the network 101 without the need to perform any measurements. Also, in another example, interference data can be estimated by the measurement module 213, or involve a combination of measured data and received data from the network 101.

In step 323, the interference data is compared with a predetermined interference criteria. Based on this comparison, the process 320 determines whether transmission of the resource block with the primary radio frequency carrier resulted in interference with adjacent frequency bands. If the comparison indicates that interference is present, the process 320 proceeds to select another carrier.

In step 325, a proper secondary radio frequency carrier is selected for the resource block. In one exemplary embodiment, the secondary radio frequency carrier is fixed, as in an ordered list of carriers to be utilized should a preceding one results in an unacceptable interference condition. In another exemplary embodiment, the secondary radio frequency carrier can be tuned dynamically based on the resource block allocation. As such, the carrier module 205 can tune to one of the voltage-controlled oscillators 217a-217n to a desired secondary radio frequency carrier. Such dynamic approach can be applied to, for example, best effort data applications (e.g., low Quality of Service applications, file transfer protocol (FTP) application, hypertext transfer protocol (HTTP) application, etc.).

In step 327, the resource block is shifted in baseband frequency based on the secondary radio frequency carrier for transmission over the uplink channel.

Figure 4A:
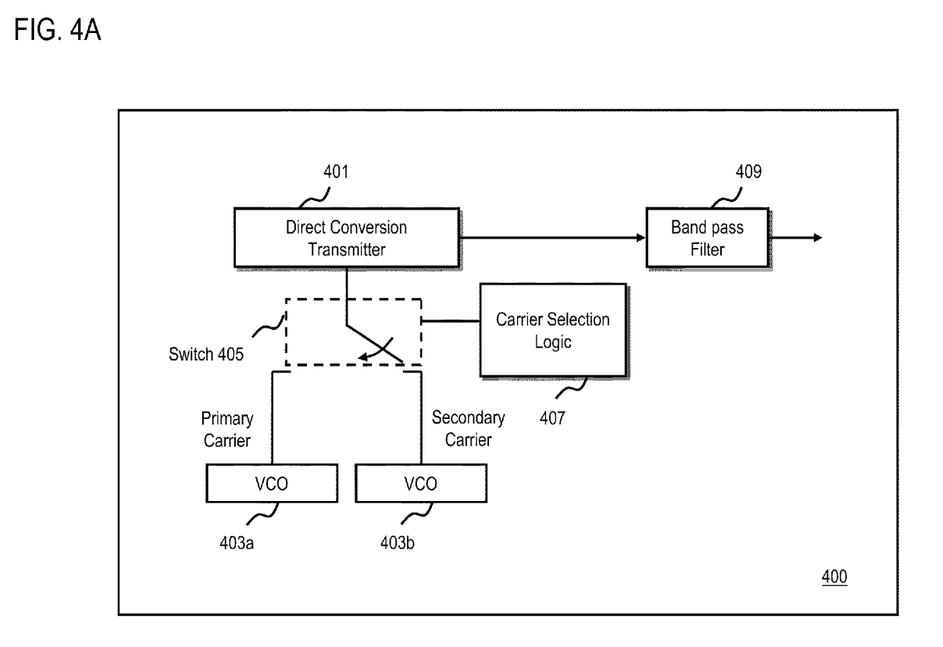
FIGS. 4A and 4B are diagrams of transmitter configurations, according to various exemplary embodiments.
Figure 4B:
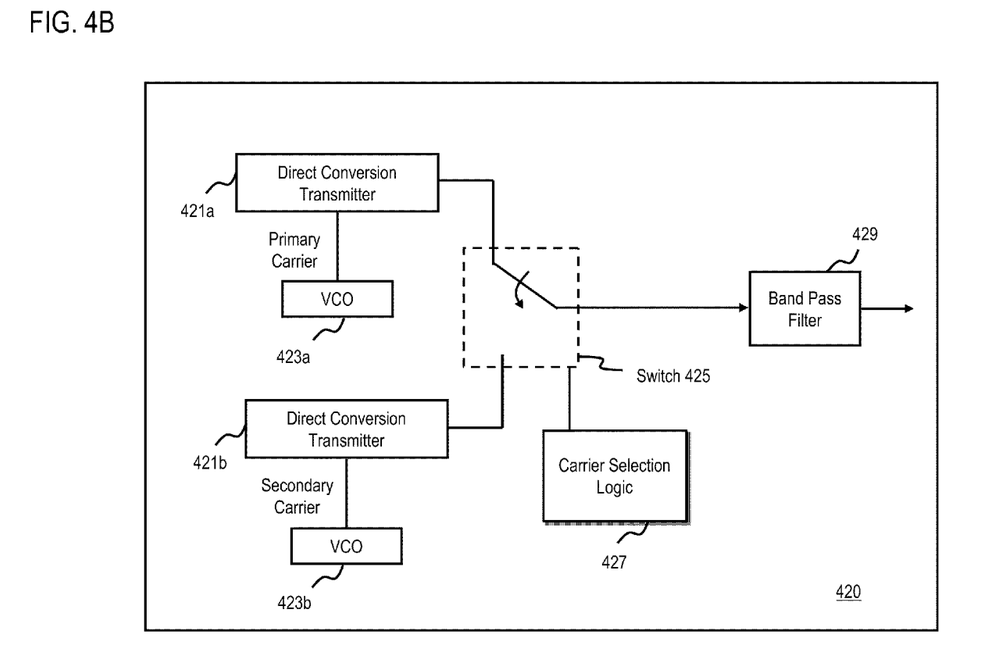

FIGS. 4A and 4B illustrate two exemplary transmitter configurations, according to various embodiments. These configurations 400, 420 differ in that either a single direct conversion transmitter is employed, or multiple direct conversion transmitters are used, depending on the application. As seen in FIG. 4A, transmitter circuitry 400 includes a direct conversion transmitter 401 that couples to two voltage-controlled oscillators 403a and 403b corresponding to two different carriers. One of the VCOs 403a and 403b generates the primary radio frequency carrier, while the other VCO generates the secondary radio frequency carrier. In one embodiment, either the primary radio frequency carrier, the secondary radio frequency carrier, or both can be fixed. In another embodiment, the primary radio frequency carrier, the secondary radio frequency carrier, or both can be tuned dynamically based on the resource block allocation. In this exemplary embodiment, at least one of the VCOs 403a and 403b can be tuned based on a proper secondary radio frequency carrier that can be calculated dynamically based on resource block allocation. As noted, any number of VCOs, beyond 2, can be utilized.

The selection of the carrier is performed by a switch 405 in conjunction with a carrier selection logic 407. The switch 405 can be controlled by the logic 407 to implement the various selection criteria for minimizing interference as described above. In an embodiment, the direct conversion transmitter 401 can receive radio frequency carrier via the switch 405; the direct conversion transmitter 401 can include, for example, an inphase/quadrature (I/Q) modulator to output a signal to a band pass filter 409. The filtered signal is then output to a power amplifier (not shown).

By contrast, the transmitter circuitry 420 of FIG. 4B utilizes multiple direct conversion transmitters 421a and 421b, corresponding to each of the VCOs 423a and 423b, respectively. In this embodiment, the switch 425 is configured to switch between output signals from the direct conversion transmitters 421a and 421b in response to a command or control signal from carrier selection logic 427. By way of example, each of the direct conversion transmitters 421a and 421b can include an I/Q modulator. The switch 425 selects the modulated signal based on a control signal or command from the selection logic 427, e.g., carrier selection module 211 for filtering by a bandpass filter 429.

It is contemplated circuitry of the switches 405, 425 can include the carrier selection logic 407 and 427, respectively, according to certain embodiments.

As discussed, such carrier selection logic 427 can compare interference data with predetermined criteria to determine the proper carrier frequency to use. Alternatively, the logic 427 can select based on prediction of the interference.

While certain exemplary embodiments and implementations of configurations 400 and 420 of FIGS. 4A and 4B are illustrated with two voltage-controlled oscillators, it is contemplated that the number of independent radio frequency carriers (and VCOs) could be increased to address additional regions (e.g., n>2). Further, configurations 400 and 420 can also be used to address intermodulation products that are due to counter intermodulation in modulators of the transmitter part of a terminal.

The processes described herein for mitigating interference from the LTE terminals to adjacent bands may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
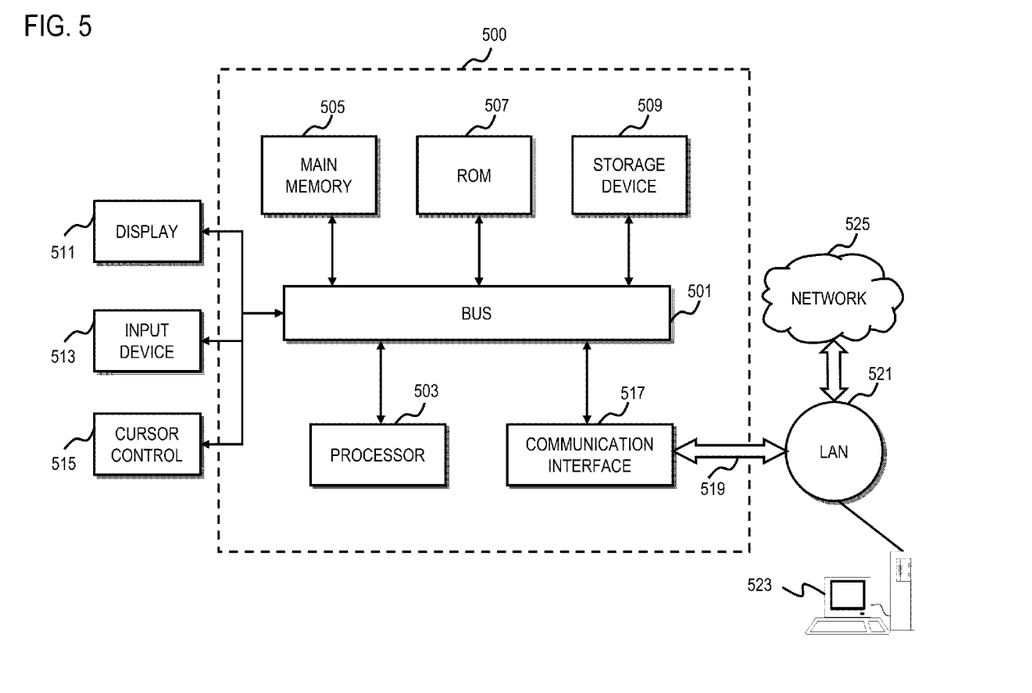
FIG. 5 is a diagram of a computer system that can be used to implement various exemplary embodiments.

FIG. 5 illustrates computing hardware (e.g., computer system) upon which an embodiment according to the invention can be implemented. The computer system 500 includes a bus 501 or other communication mechanism for communicating information and a processor 503 coupled to the bus 501 for processing information. The computer system 500 also includes main memory 505, such as random access memory (RAM) or other dynamic storage device, coupled to the bus 501 for storing information and instructions to be executed by the processor 503. Main memory 505 also can be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for controlling cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links (e.g., cellular links, WiMAX links, WiFi links, etc.) can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 5, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to non-volatile media, volatile media, and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   determining whether a region associated with transmission of one or more resource blocks is an interfering region according to a predetermined criteria, wherein the interfering region is defined based upon interference generated by a first user terminal carrying out the transmission upon another transmission carried out by a second user terminal in the proximity, and the one or more resource blocks are assigned a primary carrier as a default carrier for the transmission; and
   selecting a secondary carrier for the one or more resource blocks instead of the primary carrier if the region is determined to be interfering,
   wherein the primary carrier and the secondary carrier correspond to a first link used by the first user terminal and are spectrally adjacent to a frequency band of a second link used by the second user terminal, and the determination of the interfering region is with respect to the frequency band of the second link.

2. A method of claim 1, wherein the first link is an uplink compliant with a long term evolution (LTE) architecture and the second link is a downlink of a communication system that is either compliant with the LTE architecture or a non-LTE architecture.

3. A method of claim 1, further comprising:
   determining an interference data based on the transmission of the one or more resource blocks; and
   comparing the interference data with the predetermined criteria.

4. A method of claim 3, wherein the step of determining the interference data comprises either obtaining a measurement relating to a communication channel configured to transport the one or more resource blocks, or predicting the interference data.

5. A method of claim 1, wherein the primary carrier is generated using a first voltage-controlled oscillator embedded in the first user terminal, and the secondary carrier is generated using a second voltage-controlled oscillator embedded in the first user terminal.

6. A method of claim 1, wherein the step of selecting comprises:
   dynamically switching to the secondary carrier based on allocation of the one or more resource blocks.

7. A method of claim 1, wherein the secondary carrier is selected from one of a plurality of carriers associated with, respectively, a plurality of voltage-controlled oscillators embedded in the first user terminal, the number of voltage-controlled oscillators being two or more.

8. An apparatus comprising:
   logic configured to determine whether a region associated with transmission of one or more resource blocks is an interfering region according to a predetermined criteria, wherein the interfering region is defined based upon interference generated by a first user terminal carrying out the transmission upon another transmission carried out by a second user terminal in the proximity, and the one or more resource blocks are assigned a primary carrier as a default carrier for the transmission,
   wherein the logic is further configured to select a secondary carrier for the one or more resource blocks instead of the primary carrier if the region is determined to be interfering, and
   wherein the primary carrier and the secondary carrier correspond to a first link used by the first user terminal and are spectrally adjacent to a frequency band of a second link used by the second user terminal, and the determination of the interfering region is with respect to the frequency band of the second link.

9. An apparatus of claim 8, wherein the apparatus is embedded in the first user terminal.

10. An apparatus of claim 9, wherein the first link is an uplink compliant with a long term evolution (LTE) architecture and the second link is a downlink of a communication system that is either compliant with the LTE architecture or a non-LTE architecture.

11. An apparatus of claim 8, wherein the logic is further configured to determine an interference data based on the transmission of the one or more resource blocks, and to compare the interference data with the predetermined criteria.

12. An apparatus of claim 11, wherein the logic is further configured to either obtain a measurement relating to a communication channel configured to transport the one or more resource blocks, or to estimate the interference data.

13. An apparatus of claim 8, wherein the primary carrier is generated using a first voltage-controlled oscillator embedded in the first user terminal, and the secondary carrier is generated using a second voltage-controlled oscillator embedded in the first user terminal.

14. An apparatus of claim 8, wherein the logic is further configured to dynamically switch to the secondary carrier based on allocation of the one or more resource blocks.

15. An apparatus comprising:
   a first voltage-controlled oscillator configured to output a first carrier signal;
   a second voltage-controlled oscillator configured to output a second carrier signal;
   a switch coupled to the first voltage-controlled oscillator and the second voltage-controlled oscillator; and
   a carrier selection logic coupled to the switch and configured to output a control signal that is generated based on a determination that a region associated with transmission of one or more resource blocks is an interfering region according to a predetermined criteria, wherein the interfering region is defined based upon interference generated by the apparatus carrying out the transmission upon another transmission carried out by another apparatus in the proximity, and the one or more resource blocks are assigned the first carrier signal as a default carrier for the transmission,
   wherein the apparatus and the another apparatus are user terminals, and the switch is further configured to switch to the second carrier in response to the control signal, and
   wherein the first carrier signal and the second carrier signal correspond to a first link used by the apparatus and are spectrally adjacent to a frequency band of a second link used by the another apparatus, the determination of the interfering region is with respect to the frequency band of the second link.

16. An apparatus of claim 15, wherein the first link is an uplink compliant with a long term evolution (LTE) architecture and the second link is a downlink of a communication system that is either compliant with the LTE architecture or a non-LTE architecture.

17. A method of claim 1, wherein the interference is generated by one or more operating power amplifiers embedded in the first user terminal, and the predetermined criteria is defined with respect to out-of-band emissions that result in an interference level exceeding a predetermined threshold.

18. A method of claim 1, wherein the interfering region determination is made after each data transmission, or upon detection of a predetermined level of interference is occurring, or based on each resource block allocation before transmission.

19. A method of claim 4, wherein the interference data is predicted based upon the primary carrier and adjacent frequency bands.

\* \* \* \* \*